(12) United States Patent  
Hong et al.

(10) Patent No.: US 9,195,103 B2
(45) Date of Patent: Nov. 24, 2015

(54) DISPLAY DEVICE

(71) Applicant: Samsung Display Co., Ltd., Yongin, Gyeonggi-Do (KR)

(72) Inventors: Sunghee Hong, Hwaseong-si (KR); Jang-Il Kim, Bucheon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 135 days.

(21) Appl. No.: 13/935,291

(22) Filed: Jul. 3, 2013

(65) Prior Publication Data

US 2014/0176838 A1    Jun. 26, 2014

(30) Foreign Application Priority Data

Dec. 21, 2012  (KR) ........................ 10-2012-0150944

(51) Int. Cl.
| | | |
|---|---|---|
| *G02F 1/141* | (2006.01) | |
| *G02F 1/1343* | (2006.01) | |
| *G02F 1/1337* | (2006.01) | |
| *G02F 1/1345* | (2006.01) | |
| *G02F 1/1362* | (2006.01) | |
| *G02F 1/1333* | (2006.01) | |

(52) U.S. Cl.
CPC ........ *G02F 1/134363* (2013.01); *G02F 1/1337* (2013.01); *G02F 1/1345* (2013.01); *G02F 1/136286* (2013.01); *G02F 2001/133388* (2013.01)

(58) Field of Classification Search
CPC .......... G02F 1/13306; G02F 1/134363; G02F 1/36286
USPC ....................... 349/33, 34, 139, 147, 149, 155
See application file for complete search history.

(56) References Cited

U.S. PATENT DOCUMENTS

| 2003/0095224 | A1* | 5/2003 | Asakura et al. ............... 349/143 |
|---|---|---|---|
| 2004/0100611 | A1 | 5/2004 | Song |
| 2006/0164582 | A1 | 7/2006 | Kim et al. |
| 2008/0123029 | A1* | 5/2008 | Ko et al. ......................... 349/96 |
| 2008/0179595 | A1* | 7/2008 | Song et al. ....................... 257/59 |
| 2008/0252807 | A1* | 10/2008 | Huang et al. ................... 349/54 |
| 2009/0091671 | A1* | 4/2009 | Tsubata et al. ................. 349/38 |
| 2009/0231532 | A1* | 9/2009 | Yoshida ....................... 349/151 |

(Continued)

FOREIGN PATENT DOCUMENTS

| JP | 2001-125124 | 5/2001 |
|---|---|---|
| JP | 2003-255358 | 9/2003 |

(Continued)

*Primary Examiner* — Sang V Nguyen
(74) *Attorney, Agent, or Firm* — Innovation Counsel LLP (57) ABSTRACT

A display device comprising a display area and non-display area is provided. The display device includes a first substrate, a second substrate, a liquid crystal layer, and a connection part. The first substrate includes a first base substrate, a wiring part formed on the first base substrate, and a pixel electrode connected to a portion of the wiring part, the pixel electrode disposed in the display area. The second substrate includes a second base substrate, and a common electrode formed on the second base substrate. The liquid crystal layer is disposed between the first base substrate and the second base substrate. The connection part is formed between the first base substrate and the second base substrate connecting the common electrode and the portion of the wiring part, wherein the common electrode comprises an electric field control pattern formed in the non-display area between the connection part and the display area.

15 Claims, 9 Drawing Sheets

(56) References Cited

U.S. PATENT DOCUMENTS

| | | |
|---|---|---|
| 2010/0001965 A1* | 1/2010 | Wang et al. .................... 345/173 |
| 2010/0097538 A1* | 4/2010 | Ota ................................ 349/48 |
| 2011/0122332 A1 | 5/2011 | Kubota et al. |
| 2011/0194062 A1* | 8/2011 | Lee ............................... 349/149 |
| 2011/0221989 A1* | 9/2011 | Lee et al. ........................ 349/41 |
| 2012/0019749 A1 | 1/2012 | Ishikawa et al. |
| 2012/0133869 A1 | 5/2012 | Liao et al. |
| 2013/0155357 A1* | 6/2013 | Ota ............................... 349/110 |

FOREIGN PATENT DOCUMENTS

| | | |
|---|---|---|
| KR | 10-20000039661 | 7/2000 |
| KR | 1020100001036 | 1/2010 |
| KR | 1020120015162 | 2/2012 |

* cited by examiner

DISPLAY DEVICE

CROSS-REFERENCE TO RELATED APPLICATION

This U.S. non-provisional patent application claims priority under 35 U.S.C. §119 to Korean Patent Application No. 10-2012-0150944 filed on Dec. 21, 2012, the contents of which are hereby incorporated by reference in their entirety.

BACKGROUND

1. Field of Disclosure

The present disclosure relates to a display device. More particularly, the present disclosure relates to a display device having reduced light leakage.

2. Description of the Related Art

In general, a liquid crystal display can be used to display a desired image. The liquid crystal display may include two substrates—a lower substrate and an upper substrate. The lower substrate may include a plurality of gate lines, data lines, and pixel electrodes. The upper substrate may include a common electrode. A liquid crystal layer including liquid crystal molecules may be interposed between the lower substrate and the upper substrate.

In the liquid crystal display, an electric field may be formed by the pixel electrodes and the common electrode between the lower and upper substrates. The electric field can be configured to manipulate the orientation of the liquid crystal molecules in the liquid crystal layer, so as to modulate the amount of light passing through the liquid crystal layer for displaying a desired image.

However, if another electric field (e.g., a secondary electric field) is present near the electric field formed by the pixel electrodes and the common electrode, the liquid crystal molecules in the liquid crystal layer may misalign and light leakage may occur.

SUMMARY

The present disclosure is directed to address at least the above problems relating to misalignment of liquid crystal molecules and light leakage in a display device.

According to some embodiments of the inventive concept, a display device including a display area and a non-display area except for the display area is provided. The display device includes a first substrate, a second substrate, a liquid crystal layer, and a connection part. The first substrate includes a first base substrate, a wiring part formed on the first base substrate, and a pixel electrode connected to a portion of the wiring part, the pixel electrode disposed in the display area. The second substrate includes a second base substrate, and a common electrode formed on the second base substrate. The liquid crystal layer is disposed between the first base substrate and the second base substrate. The connection part is formed between the first base substrate and the second base substrate connecting the common electrode and the portion of the wiring part, wherein the common electrode comprises an electric field control pattern formed in the non-display area between the connection part and the display area.

In some embodiments, the electric field control pattern may include an opening formed by removing a portion of the common electrode.

In some embodiments, the electric field control pattern may include a plurality of openings.

In some embodiments, the wiring part may include a plurality of gate lines formed extending in a first direction, a plurality of data lines formed extending in a second direction that is substantially perpendicular to the first direction, and a common voltage line disposed in the non-display area and arranged along an end portion of the display area.

In some embodiments, the non-display area may include a data pad area in which end portions of the data lines are disposed, and a data fan-out area disposed between the display area and the data pad area, with the electric field control pattern disposed in the data fan-out area.

In some embodiments, the display device may include at least one data driver disposed in the data pad area and connected to the data lines, wherein the connection part is disposed in an area except for an area between the data driver and the display area, with the electric field control pattern disposed between the display area and the connection part.

In some embodiments, the non-display area may further include a gate pad area in which end portions of the gate lines are disposed, and a gate fan-out area disposed between the display area and the gate pad area, with the electric field control pattern disposed in the gate fan-out area.

In some embodiments, the display device may further include at least one gate driver disposed in the gate pad area and connected to the gate lines, wherein the connection part is disposed in an area between the gate driver and the display area, with the electric field control pattern disposed between the display area and the connection part.

In some embodiments, the wiring part may further include a plurality of storage lines formed extending in the first direction, and a storage connection line formed extending in the second direction to connect the storage lines and the data driver, with the electric field control pattern formed overlapping with a portion of the storage connection line.

In some embodiments, the display device may further include an electrostatic protection circuit disposed in one of an area between the display area and the gate driver and an area between the display area and the data driver, with the electric field control pattern formed overlapping with the electrostatic protection circuit.

In some embodiments, the non-display area may further include a test area corresponding to side portions in which at least one of the other end portions of the data lines and the other end portions of the gate lines are disposed, with the electric field control pattern disposed in the test area.

In some embodiments, the display device may further include a seal part formed between the first substrate and the second substrate in the non-display area to seal the liquid crystal layer, wherein the seal part is formed overlapping with the connection part.

In some embodiments, the first and second substrates may have a rectangular shape, and the electric field control pattern may be formed extending in at least one side portion of the first and second substrates.

In some embodiments, the electric field control pattern may include a protrusion protruding from the common electrode.

BRIEF DESCRIPTION OF THE DRAWINGS

The above and other advantages of the present disclosure will be readily apparent with reference to the following detailed description and accompanying drawings.

DETAILED DESCRIPTION

It will be understood that when an element or layer is referred to as being "on," "connected to" or "coupled to" another element or layer, it can either be formed directly on, connected or coupled to the other element or layer, or formed with intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, the described elements, components, regions, layers and/or sections are not limited by the terms used. The terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features may then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to limit the inventive concept. As used herein, the singular forms, "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, the present inventive concept will be explained in detail with reference to the accompanying drawings.

Figure 1:
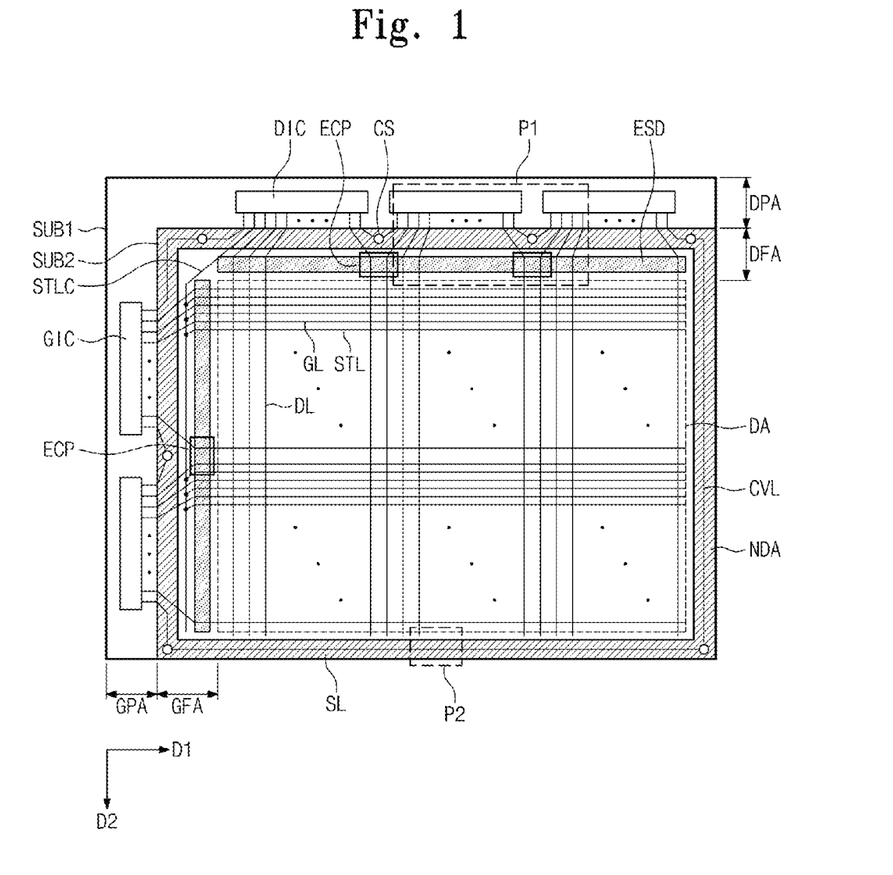
FIG. 1 is a plan view showing a display device according to an exemplary embodiment of the present disclosure.
Figure 2:
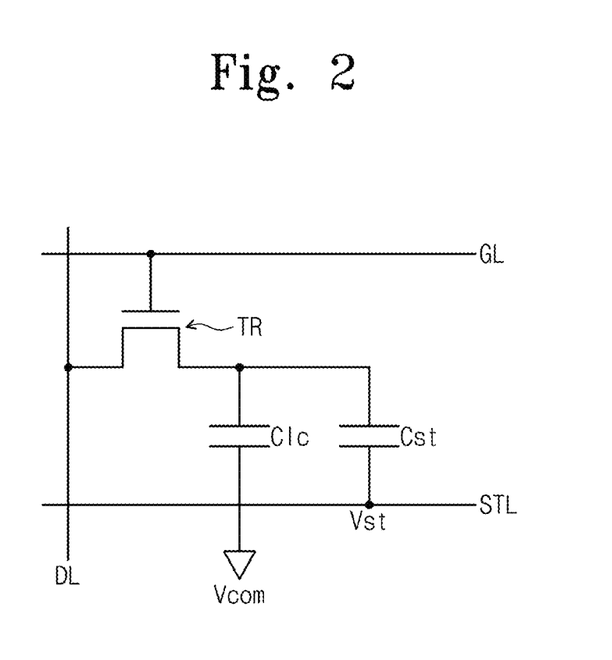
FIG. 2 is an equivalent circuit diagram showing a pixel of the display device of FIG. 1.
Figure 3:
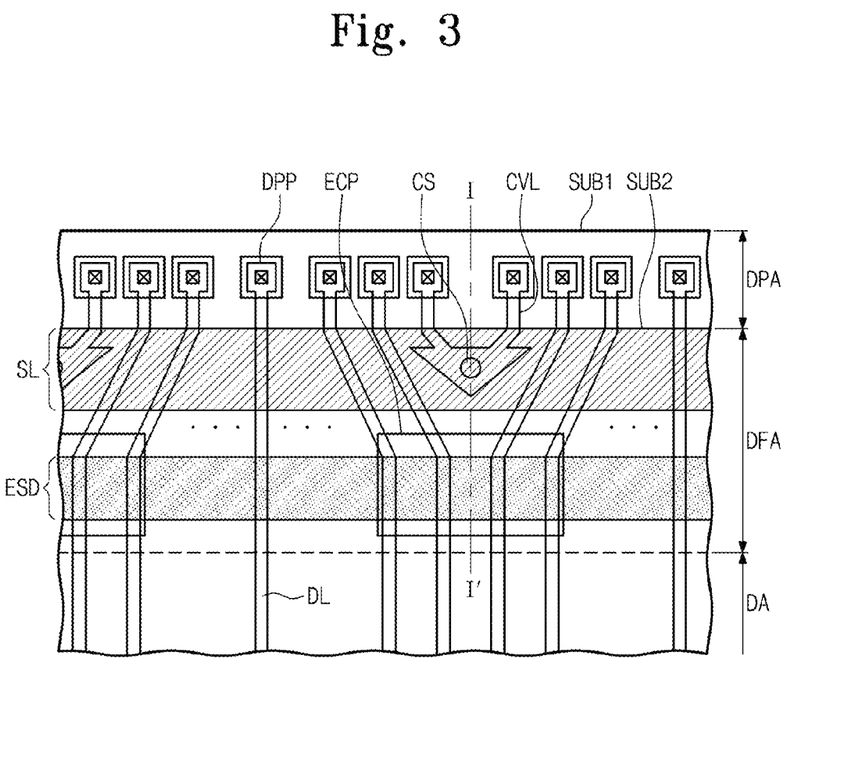
FIG. 3 is an enlarged plan view showing portion P1 of FIG. 1.
Figure 4:
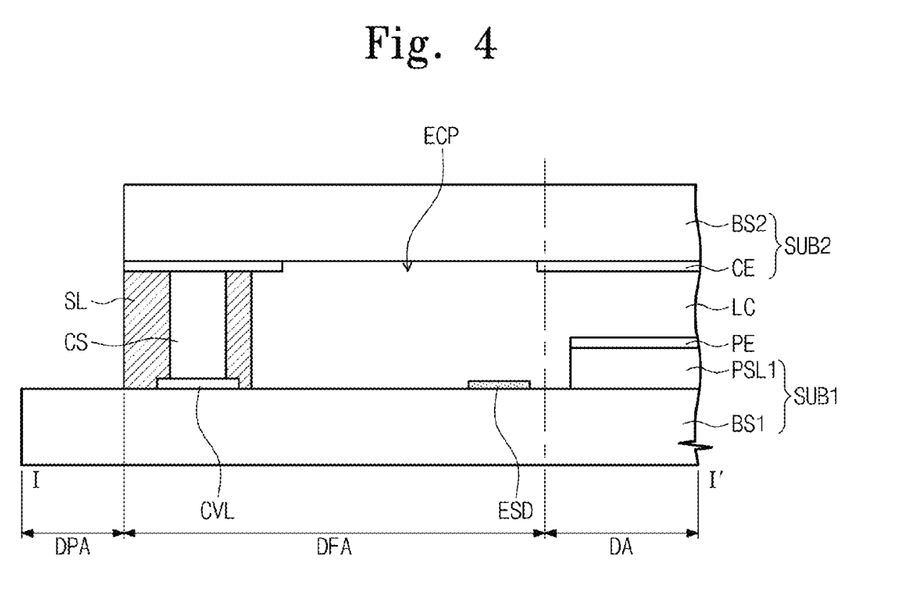
FIG. 4 is a cross-sectional view taken along line I-I' of FIG. 3.

FIG. 1 is a plan view showing a display device according to an exemplary embodiment of the present disclosure; FIG. 2 is an equivalent circuit diagram showing a pixel of the display device of FIG. 1; FIG. 3 is an enlarged plan view of portion P1 in FIG. 1; and FIG. 4 is a cross-sectional view taken along line I-I' in FIG. 3. It should be noted that the data driver DIC of FIG. 1 has been omitted in FIG. 3, so as to avoid obscuring the other elements in FIG. 3.

The display device of FIG. 1 includes a first substrate SUB1, a second substrate SUB2 facing the first substrate SUB1, and a liquid crystal layer LC interposed between the first substrate SUB1 and the second substrate SUB2. (See, e.g., FIG. 4). As shown in FIG. 1, the display device includes a display area DA for displaying an image, and a non-display area NDA surrounding the display area DA.

The first substrate SUB1 includes a first base substrate BS1 (see, e.g., FIG. 4) and a plurality of pixels formed on the first base substrate BS1 in a matrix form. The pixels are formed within the display area DA.

Referring to FIG. 1, the first substrate SUB1 includes a plurality of gate lines GL and data lines DL connected to the pixels, and a plurality of storage lines STL. The gate lines GL, data lines DL, and storage lines STL collectively constitute a plurality of wiring parts.

The gate lines GL are formed extending in a first direction D1, and arranged in a second direction D2 such that the gate lines GL are spaced apart from each other at regular intervals. The data lines DL are formed extending in the second direction D2, and arranged in the first direction D1 such that the data lines DL are spaced apart from each other at regular intervals. Although the gate lines GL and the data lines DL cross (or overlay) one another, the gate lines GL are insulated from the data lines DL because the gate lines GL and the data lines DL are formed separately on different layers. The storage lines STL are formed on the same layer as the gate lines GL, extending in the first direction D1, and arranged in the second direction D2 such that the storage lines STL are spaced apart from each other at regular intervals. Each storage line STL is formed between two adjacent gate lines GL.

As mentioned above, the pixels are formed within the display area DA. The display area DA includes a plurality of pixel areas, with each pixel area corresponding to a pixel. The pixel areas are defined by the areas bounded by the plurality of gate lines GL intersecting with the data lines DL.

FIG. 2 is an equivalent circuit diagram showing a pixel of the display device in FIG. 1. As shown in FIG. 2, the pixel includes a thin film transistor TR, a liquid crystal capacitor Clc, and a storage capacitor Cst. The storage capacitor Cst is formed by overlaying a storage line STL with a pixel electrode PE of each pixel. The storage lines STL are supplied with a storage voltage Vst.

The non-display area NDA is disposed adjacent to at least one side of the display area DA. In the example of FIG. 1, the non-display area NDA is disposed surrounding the display area DA.

The non-display area NDA includes a pad area in which one ends of the data lines DL and the gate lines GL are disposed, and a fan-out area disposed between the display area DA and the pad area. For example, as shown in FIG. 1, the non-display area NDA includes a data pad area DPA in which the one ends of the data lines DL are disposed, and a data fan-out area DFA disposed between the display area DA and the data pad area DPA. The non-display area NDA includes a gate pad area GPA in which the one ends of the gate lines GL are disposed, and a gate fan-out area GFA disposed between the display area DA and the gate pad area GPA.

Different types of drivers may be formed in the pad area. For example, a data driver DIC may be formed in the data pad area DPA, and a gate driver GIC may be formed in the gate pad area GPA.

The data driver DIC is connected to the one ends of the data lines DL in the data pad area DPA. The one ends of the data lines DL are provided with data pads DPP (see, e.g., FIG. 3) to be connected to external lines. The data driver DIC is electrically connected to the data pads DPP of the data lines DL, and configured to apply data signals to the data lines DL. The data driver DIC may be formed along a long side of the display device. (See, e.g., FIG. 1). A plurality of data drivers DIC may be provided in the display device. For example, the display device of FIG. 1 includes three data drivers DIC formed in the data pad area DPA.

The gate driver GIC is connected to the one ends of the gate lines GL in the gate pad area GPA. The one ends of the gate lines GL are provided with gate pads (not shown) to be connected to external lines. The gate driver GIC may be formed along a short side of the display device. (See, e.g., FIG. 1). The gate driver GIC is electrically connected to the gate pads of the gate lines GL, and configured to sequentially apply gate signals to the gate lines GL, in order to scan a plurality of pixel rows located along the short side of the display device. A plurality of gate drivers GIC may be provided in the display device. For example, the display device of FIG. 1 includes two gate drivers GIC formed in the gate pad area GPA.

In some embodiments, the gate driver GIC may include a plurality of transistors (e.g., amorphous silicon transistors) formed directly on the first substrate SUB1 using a thin film process. By forming the gate driver GIC comprising a plurality of transistors directly on the first substrate SUB1, less space is occupied by the gate driver GIC on the display device and as a result, the gate pad area GPA may be omitted in those embodiments. In those particular embodiments, the gate driver GIC is electrically (and directly) connected to the gate lines GL.

In some embodiments, the data driver DIC may include a plurality of transistors (e.g., amorphous silicon transistors) formed directly on the first substrate SUB1 using a thin film process. By forming the data driver DIC comprising a plurality of transistors directly on the first substrate SUB1, less space is occupied by the data driver DIC on the display device and as a result, the data pad area DPA may be omitted in those embodiments. In those particular embodiments, the data driver DIC is electrically (and directly) connected to the data lines DL.

As noted previously, the gate lines GL, data lines DL, and storage lines STL collectively constitute a plurality of wiring parts. The wiring parts are formed extended and connected to the drivers (e.g., data driver DIC and/or gate driver GIC) in the fan-out area. For example, as shown in the fan-out area in FIG. 1, the data lines DL and gate lines GL are formed branching out from the data driver DIC and gate driver GIC, respectively, and extending into the display area DA.

Referring to FIG. 1, a storage connection line STLC is formed in the non-display area NDA. The storage connection line STLC is formed branching out from the data driver DIC at a side portion of the gate fan-out area GFA, and extending in the second direction D2. The storage connection line STLC connects the one ends of the storage lines STL to each other. In some embodiments, the storage connection line STLC may further connect the other ends of the storage lines STL. The storage connection line STLC is configured to receive a storage voltage Vst from an external device (not shown) and apply the storage voltage Vst to the storage lines STL. The storage connection line STLC is electrically insulated from a common voltage line CVL.

As shown in FIG. 1, an electrostatic protection circuit ESD is formed in the non-display area NDA. The electrostatic protection circuit ESD is configured to prevent static electricity from being induced in the display device. The electrostatic protection circuit ESD may include an electrostatic protection diode or an electrostatic protection thin film transistor. The electrostatic protection circuit ESD may be formed in the non-display area NDA adjacent to the display area DA in which the pixels are arranged. Specifically, the electrostatic protection circuit ESD may be formed between the display area DA and the pad area (e.g., in an area between the display area DA and gate pad area GPA and/or an area between the display area DA and data pad area DPA). In the example of FIG. 1, the electrostatic protection circuit ESD is formed between the display area DA and gate pad area GPA, and between the display area DA and data pad area DPA.

Referring to FIG. 4, the second substrate SUB2 includes a second base substrate BS2 and a common electrode CE formed on portions of the second base substrate BS2. As shown in FIG. 4, the common electrode CE is formed opposite to and facing the pixel electrode PE (the pixel electrode PE being formed on the first substrate SUB1). The common electrode CE and the pixel electrode PE collectively form the liquid crystal capacitor Clc (shown in FIG. 2). By applying a common voltage Vcom to the common electrode CE, an electric field is formed between the common electrode CE and pixel electrode PE (i.e., the electric field is formed in the liquid crystal capacitor Clc).

Referring to FIG. 4, the wiring parts further include a common voltage line CVL formed on the first substrate SUB1. By supplying the common voltage Vcom to the common voltage line CVL, the common voltage Vcom can be applied to the common electrode CE. The common voltage line CVL is connected to at least one of the drivers (e.g., data driver DIC and gate driver GIC). As shown in FIG. 1, the common voltage line CVL is formed in the non-display area NDA between adjacent drivers, and arranged around the display area DA.

The common electrode CE includes an electric field control pattern ECP in the non-display area NDA for controlling the electric field.

Referring to FIG. 4, the liquid crystal layer LC, a connection part CS, and a seal part SL are disposed between the first substrate SUB1 and the second substrate SUB2. The liquid crystal layer LC includes liquid crystal molecules.

The orientation of the liquid crystal molecules in the liquid crystal layer LC can be manipulated by the electric field formed between the pixel electrode PE and common electrode CE.

The connection part CS is formed in direct contact with the common electrode CE and common voltage line CVL, and electrically connects the common voltage line CVL to the common electrode CE. When viewed from a plan view, the connection part CS is seen overlapping with the common electrode CE. The connection part CS includes a conductive spacer formed between the common voltage line CVL and the common electrode CE, which allows the common voltage line CVL and the common electrode CE to be electrically connected.

Since the connection part CS is formed in direct contact with the common voltage line CVL, the connection part CS will be formed in an area where the common voltage line CVL is located. In some embodiments, the common voltage line CVL is formed between adjacent data drivers DIC and between adjacent gate drivers GIC. In those particular embodiments, the connection part CS will be formed between the adjacent data drivers DIC and between the adjacent gate drivers GIC. However, since portions of the data lines DL are formed between the data drivers DIC and display area DA, and portions of the gate lines GL are formed between the gate drivers GIC and display area DA, the common voltage line CVL and connection part CS will not be formed in the areas where the aforementioned portions are located. In other words, in the above embodiments, the connection part CS is formed in the data fan-out area DFA, except in the areas between the data drivers DIC and display area DA and between the gate drivers GIC and display area DA.

When viewed from a plan view, the connection part CS is seen having a plate shape extending in the same direction as the common voltage line CVL. That is, the connection part CS is formed in the non-display area having the plate shape rather than a cylinder or polygonal prism shape, except in the fan-out area where the data drivers DIC are located. The number of (and position of) the connection part(s) CS is not limited to the described embodiments. For example, the number of (and position of) the connection part CS may be changed depending on the size and arrangement of the elements in the display device.

As previously described, the common voltage Vcom applied to the common voltage line CVL may be applied to the common electrode CE through the connection part CS. In some other embodiments, the common electrode CE may be connected to the common voltage line CVL in different ways (e.g., using a silver dotting process), instead of using the connection part CS.

The common electrode CE includes the electric field control pattern ECP in the non-display area NDA for controlling the electric field. By controlling the electric field using the electric field control pattern ECP, misalignment of the liquid crystal molecules in the non-display area NDA can be prevented or reduced.

In some embodiments, the electric field control pattern ECP may include an opening formed by removing a portion of the common electrode CE. A portion of an upper surface of the second base substrate BS2 may be exposed through the opening. In those particular embodiments, since the portion of the common electrode CE has been removed (to form the opening), an electric field will not be formed in an area corresponding to the opening. In some instances, although a secondary electric field may be formed between the pixel electrode PE and the connection part CS, the secondary electric field will be relatively weak (compared to the electric field between the pixel electrode PE and the common electrode CE). Therefore the interference from a secondary electric field (if present) with the electric field between the pixel electrode PE and common electrode CE will be minimal in the above-described embodiments.

In some other embodiments, the electric field control pattern ECP may include a protrusion protruding from the common electrode CE. In those particular embodiments, an electric field formed (in an area adjacent to the protrusion) between the pixel electrode PE and the connection part CS will be weakened due to electric-field distortion created by the protrusion. Therefore the interference from a secondary electric field (if present) with the electric field between the pixel electrode PE and common electrode CE will also be minimal in the above-described embodiments.

As previously mentioned, interference from a secondary field may cause liquid crystal molecules in a display device to misalign, thereby resulting in light leakage from the display device. Accordingly, the inclusion of the electric field control pattern ECP in the above-described embodiments can prevent or reduce misalignment of the liquid crystal molecules in the non-display area NDA, and reduce light leakage from the display device.

Next, the electric field control pattern ECP including the opening will be described in further detail.

The electric field control pattern ECP is formed between the connection part CS and the display area DA where the pixel electrodes PE are disposed. As shown in FIG. 1, the electric field control pattern ECP is formed in the data fan-out area DFA between the data drivers DIC overlapping with a portion of the data lines DL. The electric field control pattern ECP is also formed in the gate fan-out area GFA between the gate drivers GIC overlapping with a portion of the gate lines GL. The electric field control pattern ECP is sized such that the display area DA is spaced apart from the connection part CS by a predetermined distance.

When viewed from a plan view, the electric field control pattern ECP is seen overlapping with a portion of the electrostatic protection circuit ESD. (See, e.g. FIG. 1). In addition, when the electric field control pattern ECP is formed between the gate drivers GIC, the electric field control pattern ECP may be seen overlapping with a portion of the storage connection line STLC (when viewed from a plan view).

In some embodiments, the electric field control pattern ECP is formed over the entire area between the data drivers DIC and the gate drivers GIC, but is not limited thereto. For example, in some other embodiments, the electric field control pattern ECP may be formed in one of the areas between the data drivers DIC and between the gate drivers GIC. Since a distance between the connection part CS and pixel electrode PE in the data fan-out area DFA is greater than a distance between the connection part CS and pixel electrode PE in the gate fan-out area GFA, the electric field control pattern ECP may be formed in the areas between the data drivers DIC. In some embodiments, the electric field control pattern ECP is not formed in the areas between the gate drivers GIC.

The electric field control pattern ECP may include one or more openings in the non-display area NDA. Also, the electric field control pattern ECP may be provided at each position corresponding to a connection part CS.

The electric field control pattern ECP may be formed extending along an end portion of the display area DA. FIGS. 1 and 3 show one side of the electric field control pattern ECP being spaced apart from the display area DA. By locating one side of the electric field control pattern ECP near a boundary of the display area DA, abnormalities (due to interferences) in the electric field in the non-display area NDA can be minimized.

The electric field control pattern can have various shapes. In some embodiments, the electric field control pattern may have a rectangular shape (see, e.g., FIG. 1). In other embodiments, the electric field control pattern may include a slit extended in one direction, a polygonal shape, or a circular shape. In some other embodiments, the electric field control pattern may have a shape that is bent several times.

Referring to FIG. 4, the seal part SL is formed between the first substrate SUB1 and the second substrate SUB2. The seal part SL is formed in the non-display area NDA along an end portion of the second substrate SUB2 to seal the liquid crystal layer LC. When viewed from a plan view, the seal part SL is seen overlapping with a portion of the common voltage line CVL and a portion of the connection part CS. (See, e.g., FIG. 1).

In the display device of FIG. 1, when a gate signal is applied to the gate line GL, the thin film transistor TR is turned on. Accordingly, a data signal applied to the data line DL will be applied to the pixel electrode PE through the thin film transistor TR. When the data signal is applied to the pixel electrode PE through the turned-on thin film transistor TR, an electric field is formed between the pixel electrode PE and the common electrode CE. By adjusting the respective voltages applied to the common electrode CE and the pixel electrode PE, the electric field can be controlled to manipulate the orientation of the liquid crystal molecules in the liquid crystal layer LC. By manipulating the orientation of the liquid crystal molecules, the amount of the light passing through the liquid crystal layer LC can be modulated to display a desired image.

In the example of FIG. 1, a common voltage is applied from the common voltage line CVL to the common electrode CE through the connection part CS. Thus, a voltage difference can occur between the connection part CS and the pixel electrode PE. A secondary electric field generated by the voltage difference can cause the liquid crystal molecules to misalign and result in light leakage along an end portion of the display area DA. However, by forming an electric field control pattern ECP between the connection part CS and the pixel electrode PE, the secondary electric field between the connection part CS and the pixel electrode PE can be eliminated (or significantly weakened).

As previously mentioned, interference from a secondary field may cause liquid crystal molecules in a display device to misalign, thereby resulting in light leakage from the display device. Accordingly, the inclusion of the electric field control pattern ECP in the above-described embodiments can prevent or reduce misalignment of the liquid crystal molecules in the non-display area NDA, and reduce light leakage from the display device.

Figure 5A:
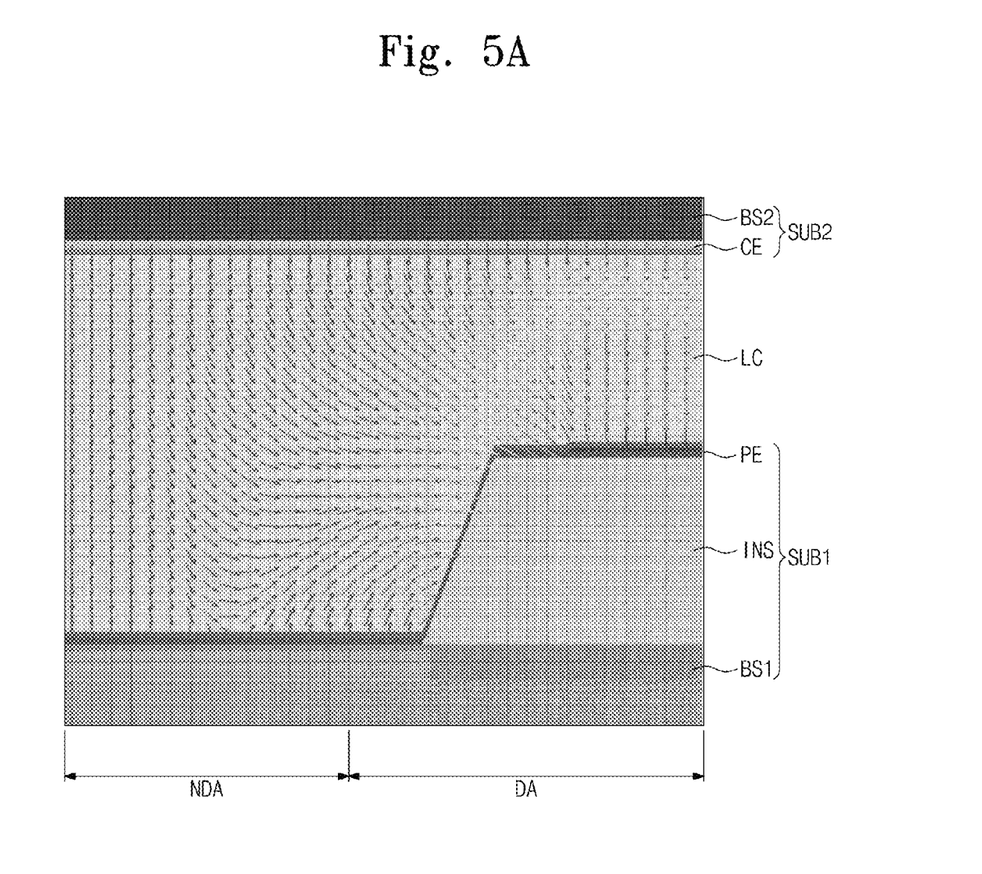
FIG. 5A is a simulated view showing the orientation of the liquid crystal molecules disposed between a display area and a non-display area in a conventional display device.
Figure 5B:
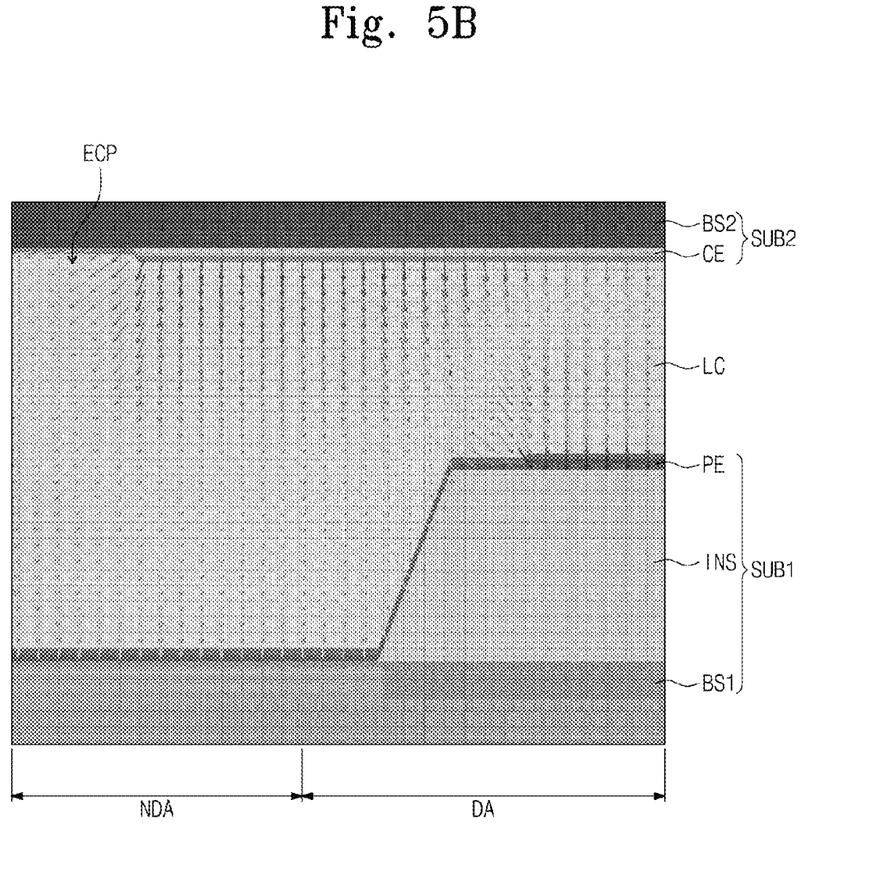
FIG. 5B is a simulated view showing the orientation of the liquid crystal molecules between a display area and a non-display area in a display device according to an exemplary embodiment.

FIG. 5A is a simulated view showing the orientation of liquid crystal molecules disposed between a display area and a non-display area in a conventional display device. FIG. 5B is a simulated view showing the orientation of liquid crystal molecules disposed between a display area and a non-display area in a display device according to an exemplary embodiment of the present disclosure. The display devices of FIGS. 5A and 5B may include some elements that are similar to those described in the display device of FIGS. 1-4. FIGS. 5A and 5B also include a reference sign "INS" which refers to an insulating layer (including a color filter). In the display devices of FIGS. 5A and 5B, the connection part CS is formed on a left side of the non-display area NDA connecting the common voltage line CVL of the first substrate SUB1 and the common electrode CE of the second substrate SUB2.

In the conventional display device of FIG. 5A, when voltages are respectively applied to the common electrode CE and the pixel electrode PE, an electric field is formed between the common electrode CE and the pixel electrode PE in the display area. The liquid crystal molecules in a display area may be aligned in a uniform direction under the influence of the electric field, for example, in a vertical direction (see, e.g., FIG. 5A). However, as further shown in FIG. 5A, the liquid crystal molecules in a non-display area may be aligned in various directions. The misalignment of the liquid crystal molecules in the non-display area is a result of a secondary electric field formed between a connection part (not shown) and the pixel electrode PE interfering with the electric field formed in the display area between the common electrode CE and the pixel electrode PE. Consequently, some of the liquid crystal molecules between the connection part and the pixel electrode PE may be aligned in a direction that is substantially parallel (or at an inclined direction) to an upper surface of the first substrate SUB1 (i.e., in a non-vertical direction).

In the exemplary display device of FIG. 5B, when voltages are respectively applied to the common electrode CE and the pixel electrode PE, an electric field is formed between the common electrode CE and the pixel electrode PE in the display area. The liquid crystal molecules in a display area may be aligned in a uniform direction under the influence of the electric field, for example, in a vertical direction (see, e.g., FIG. 5B). Unlike the conventional display device of FIG. 5A, the liquid crystal molecules in the exemplary display device of FIG. 5B are aligned more uniformly in the same direction in both the display and non-display areas. For example, as shown in FIG. 5B, the bulk of the liquid crystal molecules in the non-display area are aligned in the same (or similar) direction as the liquid crystal molecules in the display area. The uniformity in alignment can be obtained by including an electric field control pattern ECP comprising an opening formed in the common electrode CE of the non-display area. In the exemplary display device of FIG. 5B, the opening prevents a secondary electric field from forming between the connection part (not shown) and the pixel electrode PE. In some instances, even if a secondary electric field is formed between the connection part and the pixel electrode PE, the secondary electric field is still relatively weak compared to the electric field formed between the common electrode CE and the pixel electrode PE in the display area. As previously mentioned, interference from a secondary field may cause liquid crystal molecules in a display device to misalign, thereby resulting in light leakage from the display device. Accordingly, the inclusion of the electric field control pattern ECP in the exemplary display device of FIG. 5B can prevent or reduce misalignment of the liquid crystal molecules in the non-display area NDA, and reduce light leakage from the display device.

Figure 6:
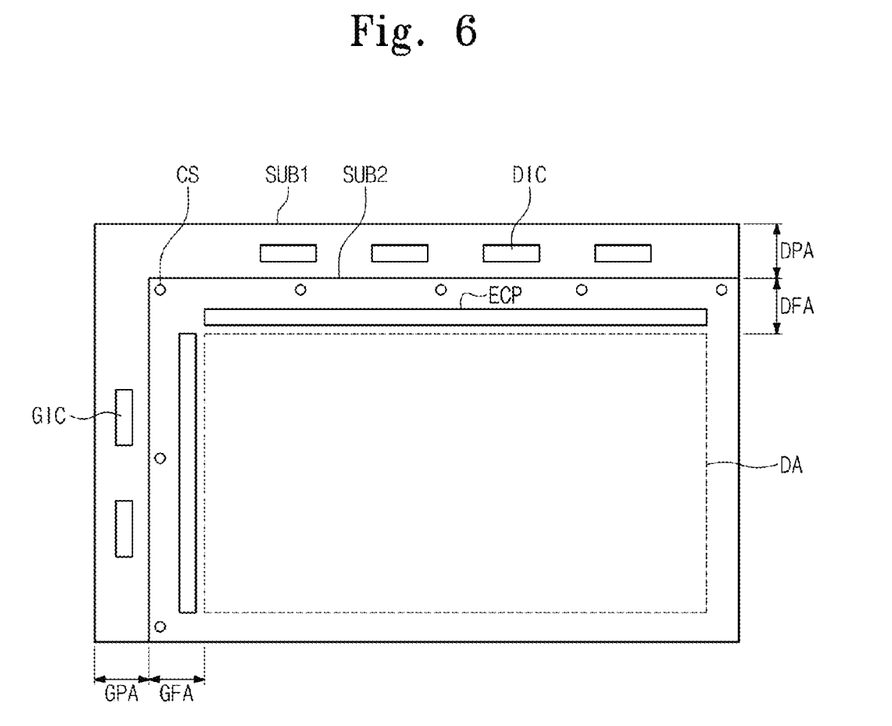
FIG. 6 is a plan view showing a display device according to another exemplary embodiment.

FIG. 6 is a plan view showing a display device according to another exemplary embodiment of the present disclosure. The references depicted in FIG. 6 denote the same elements as those shown in FIG. 1, and thus detailed descriptions of these elements shall be omitted.

Referring to FIG. 6, an electric field control pattern ECP having a slit-like shape is formed in the data fan-out area DFA and the gate fan-out area GFA, extending near to and along an end portion of the display area DA. The electric field control pattern ECP in the data fan-out area DFA is formed extending along the long side of the display area DA (e.g., the first direction D1), and the electric field control pattern ECP in the gate fan-out area GFA is formed extending along the short side of the display area DA (e.g., the second direction D2). The electric field control pattern ECP in the data fan-out area DFA and the electric field control pattern ECP in the gate fan-out area GFA are formed spaced apart from each other.

In some embodiments, the electric field control pattern ECP is formed between the display area and the data fan-out area, and between the display area and the gate fan-out area. In those embodiments, the directions of the liquid crystal molecules can be controlled in the non-display area NDA using the electric field control pattern ECP, regardless of the positions of the data driver, the gate driver, and the connection part CS.

Figure 7:
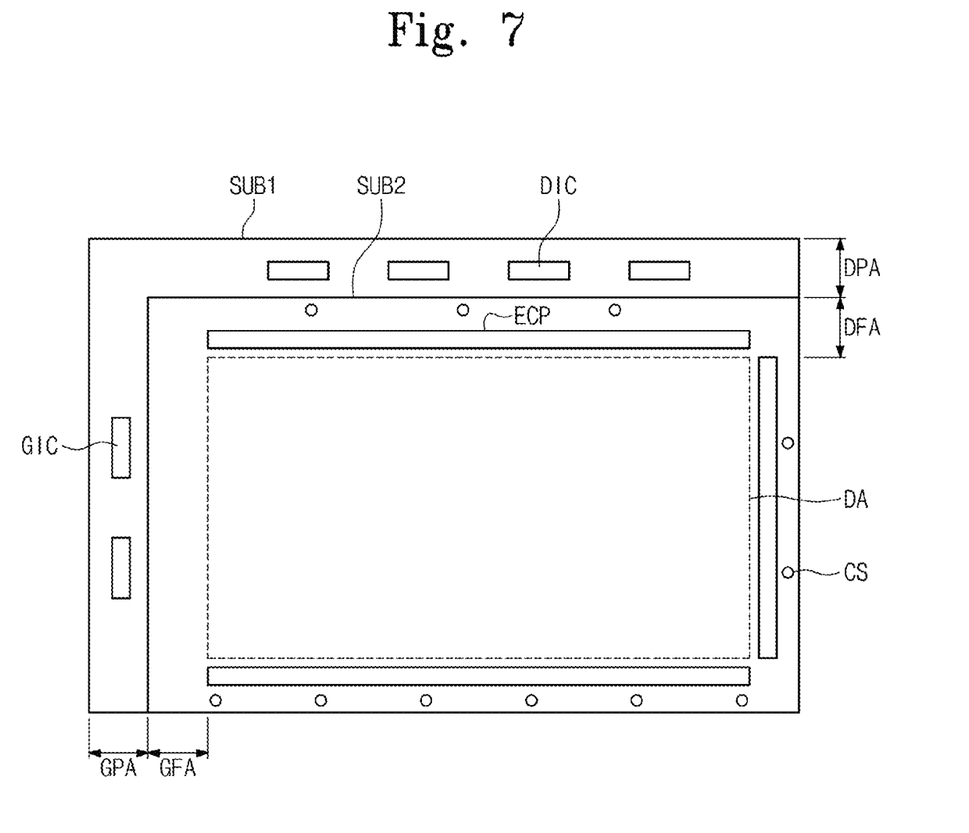
FIG. 7 is a plan view showing a display device according to a further exemplary embodiment.
Figure 8:
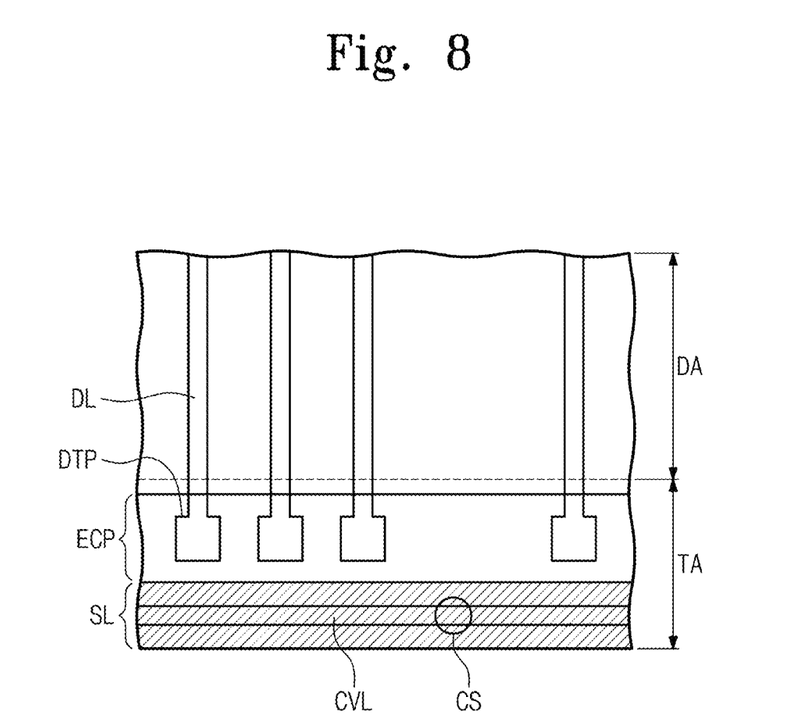
FIG. 8 is an enlarged plan view showing a portion of the display device of FIG. 7, corresponding to portion P2 of FIG. 1.

FIG. 7 is a plan view showing a display device according to a further exemplary embodiment of the present disclosure, and FIG. 8 is an enlarged plan view showing a portion of the display device in FIG. 7. FIG. 8 also corresponds to a portion P2 of FIG. 1.

Referring to FIGS. 7 and 8, the non-display area NDA further includes a test area TA in which the other ends of the wiring parts are disposed. The seal part SL is formed in the test area TA along an end portion of the test area TA, and the common voltage line CVL is formed on the first substrate SUB1 to overlap with the seal part SL. A plurality of connection parts CS are formed on the common voltage line CVL. A secondary electric field is formed between a connection part CS and a pixel electrode PE of the display area DA.

In some embodiments, an electric field control pattern ECP is formed in the test area TA, so as to prevent a secondary electric field from being formed between the connection part CS and the pixel electrode PE of the display area DA. The electric field control pattern ECP may have a slit-like shape, and may be formed in the test area TA, extending along an end portion of the display area DA.

In the examples of FIGS. 7 and 8, the non-display area NDA includes the data pad area DPA, the data fan-out area DFA, and the test area TA. The end portions of the data lines DL are disposed in the data pad area DPA. The data fan-out area DFA is disposed between the display area DA and the data pad area DPA. The other end portions of the data lines DL are disposed in the test area TA. As shown in the test area TA in FIG. 8, the other end portions of the data lines DL are provided with data test pads DTP for inspection of the data lines DL. Accordingly, the electric field control pattern ECP is formed in the test area TA overlapping with the data test pads DTP. In some embodiments (not shown), at least one test line (preferably two test lines) connected to the data test pads DTP may be formed between adjacent data test pads DTP. A test probe that is in contact with the data test pads DTP can be used to check for defects in the data lines DL.

The data test pads DTP may be located at the other ends of the gate lines or the storage lines, and the electric field control pattern ECP may be formed in a slit-like shape to overlap with the data test pads DTP. The inspection method for the gate lines or the storage lines may be similar to the inspection method for the data lines.

The above-described structural embodiments may prevent or reduce the misalignment of the liquid crystal molecules in the non-display area, and reduce light leakage from the display device.

Although different embodiments of the inventive concept have been described, it is understood that the inventive concept is not limited to the above-described embodiments, and various changes and modifications can be made by one of ordinary skill in the art within the spirit and scope of the inventive concept.

What is claimed is:

1. A display device comprising a display area and a non-display area, comprising:
    a first substrate including a first base substrate, a wiring part formed on the first base substrate, and a pixel electrode connected to a first portion of the wiring part, the pixel electrode disposed in the display area;
    a second substrate including a second base substrate, and a common electrode formed on the second base substrate, wherein the common electrode comprising an electric field control pattern formed in the non-display area;
    a liquid crystal layer disposed between the first base substrate and the second base substrate;
    a connection part formed between the first base substrate and the second base substrate connecting the common electrode and a second portion of the wiring part; and
    an electrostatic protection circuit disposed in the non-display area,
    wherein the electric field control pattern is formed between the connection part and the display area,
    wherein the electric field control pattern is formed overlapping with at least a portion of the electrostatic protection circuit, and
    wherein the electrostatic protection circuit is disposed in one of an area between the display area and a gate driver and an area between the display area and a data driver.

2. The display device of claim 1, wherein the electric field control pattern comprises an opening formed by removing a portion of the common electrode.

3. The display device of claim 2, wherein the electric field control pattern comprises a plurality of openings.

4. The display device of claim 2, wherein the wiring part comprises:
    a plurality of gate lines formed extending in a first direction;
    a plurality of data lines formed extending in a second direction that is substantially perpendicular to the first direction; and
    a common voltage line disposed in the non-display area and arranged along an end portion of the display area.

5. The display device of claim 4, wherein the non-display area comprises a data pad area in which end portions of the data lines are disposed, and a data fan-out area disposed between the display area and the data pad area, with the electric field control pattern disposed in the data fan-out area.

6. The display device of claim 5, wherein the data driver is disposed in the data pad area and connected to the data lines, wherein the connection part is disposed in an area except for an area between the data driver and the display area.

7. The display device of claim 6, wherein the non-display area further comprises a gate pad area in which end portions of the gate lines are disposed, and a gate fan-out area disposed between the display area and the gate pad area, with the electric field control pattern disposed in the gate fan-out area.

8. The display device of claim 6, wherein the gate driver is disposed in the gate pad area and connected to the gate lines, wherein the connection part is disposed in an area except for an area between the gate driver and the display area.

9. The display device of claim 6, wherein the wiring part further comprises a plurality of storage lines formed extending in the first direction, and a storage connection line formed extending in the second direction to connect the storage lines and the data driver, with the electric field control pattern formed overlapping with a portion of the storage connection line.

10. The display device of claim 7, wherein the non-display area further comprises a test area corresponding to side portions in which at least one of the other end portions of the data lines and the other end portions of the gate lines are disposed, with the electric field control pattern disposed in the test area.

11. The display device of claim 1, further comprising a seal part formed between the first substrate and the second substrate in the non-display area to seal the liquid crystal layer, wherein the seal part is formed overlapping with the connection part.

12. The display device of claim 1, wherein the first and second substrates have a rectangular shape, and the electric field control pattern is formed extending in at least one side portion of the first and second substrates.

13. A display device comprising a display area and a non-display area, comprising:
  a first substrate including a first base substrate, a wiring part formed on the first base substrate, and a pixel electrode connected to a portion of the wiring part, the pixel electrode disposed in the display area;
  a second substrate including a second base substrate, and a common electrode formed on the second base substrate, wherein the common electrode comprising an electric field control pattern formed in the non-display area;
  a liquid crystal layer disposed between the first base substrate and the second base substrate; and
  a connection part formed between the first base substrate and the second base substrate connecting the common electrode and a portion of the wiring part,
  wherein the electric field control pattern is formed between the connection part and the display area,
  wherein the non-display area comprises a test area corresponding to side portions in which at least one of the other end portions of the wiring part are disposed, and
  wherein the electric field control pattern is formed overlapping with at least an area of the test area.

14. The display device of claim 13, wherein the non-display area further comprises a pad area in which end portions of the wiring part are disposed and a driver connected a portion of the wiring part is disposed, and a fan-out area disposed between the display area and the pad area, with the electric field control pattern disposed in the fan-out area.

15. The display device of claim 14, further comprising an electrostatic protection circuit disposed in one of an area between the display area and the driver,
  wherein the electric field control pattern is formed overlapping with the electrostatic protection circuit.

* * * * *